United States Patent Office 2,929,840
Patented Mar. 22, 1960

2,929,840
ISOLATION OF CYSTINE

Bruno Vassel, Sao Paulo, Brazil, assignor to International Minerals & Chemical Corporation, a corporation of New York No Drawing. Application October 15, 1957
Serial No. 690,221

6 Claims. (Cl. 260—534)

This invention relates to the preparation of substantially pure cystine. More particularly, it relates to the isolation of cystine from admixture with tyrosine.

Cystine, 3,3'-dithiobis(2-aminopropanoic acid), is a constituent of protein hydrolyzates, from which it is commercially separated as a solid mixture with tyrosine and the leucines. Cystine is a starting material for the preparation of cysteine, which has numerous medicinal uses, and for this and other purposes it is desirable to prepare the parent compound in essentially pure form.

An object of the present invention is to isolate cystine from admixture with tyrosine and the leucines.

Another object is to prepare essentially pure cystine.

A further object is to separate and recover the tyrosine impurity contained in crude cystine.

Other objects of the invention will be apparent from the present description and claims.

The present invention rests upon my discovery that cystine is selectively dissolved from a crude mixture thereof with tyrosine by an aqueous solution of an alkali-metal hydroxide at pH 9.5–10.3. The cystine can be extracted substantially completely in this way if a sufficient quantity of the alkaline solution is provided, and the resulting solution contains little or no tyrosine if the extraction is carried out within the defined pH range. For highest recovery and greatest purity, the extraction should be carried out at a pH precisely controlled around 10.1.

In practicing one embodiment of the invention, a solid mixture of cystine and tyrosine, preferably containing from about 10 to about 75% by weight of cystine, is mixed with a sufficient quantity of aqueous sodium hydroxide solution to produce a pH around 10.1 in the resulting mixture. The cystine is thus selectively dissolved, and can be separated from the solid tyrosine by filtration, centrifugation, settling and decantation, or the like. The cystine can then be crystallized from the solution by acidification to around pH 3.6 and allowing to stand. The solid material obtained thereby can be further purified by washing with hot water (90–100° C.) to remove any retained tyrosine, and may then be dried.

My invention is especially applicable to the treatment of the liquors resulting from the separation of tyrosine in the process claimed in my U.S. Patent 2,738,366 (March 13, 1956), as will now be more fully explained.

A convenient source of crude cystine for treatment according to my invention is the tyrosine-leucine-cystine cake that is conventionally separated from wheat gluten acid hydrolyzates at pH 5.5–6.5.

The leucines are first separated therefrom by the following procedure. The cake is dissolved in aqueous hydrochloric acid solution at a temperature of 60–100° C., preferably 90–95° C., and at a pH between 0.5 and 2.0, preferably 1.0–1.5. The hot solution is decolorized, filtered, adjusted to pH 2.0–3.5, preferably 2.5–3.0, and allowed to cool slowly over a period of 4 to 24 hours, preferably 8 to 16 hours. The leucines are substantially completely soluble under these conditions, while the cystine and tyrosine crystallize out. The resulting mixture of tyrosine with about 2 to about 15% cystine is filtered off.

The cystine-tyrosine mixture is then treated to separate substantially pure tyrosine therefrom. For this purpose, the cystine-tyrosine mixture is mixed with around 4 to 7 parts by weight of water, preferably about 5 parts, and ammonium hydroxide solution is added to adjust the pH to between about 10.70 and about 11.25, preferably about 10.8. The resulting mixture is agitated for a short while, suitably 0.75 to 1.5 hours, during which time the cystine is dissolved substantially completely. The resulting slurry is filtered to separate the solid tyrosine. The tyrosine is washed with weak ammoniacal solution, then with water, and may be further purified, if desired, by dissolving in acid, decolorizing with carbon, and recrystallizing.

The tyrosine filtrate and wash liquor ordinarily contain a mixture of cystine and tyrosine in about equal parts by weight. These liquors can be mixed and acidified to around pH 5.5 to precipitate the cystine and tyrosine, which are then filtered off and used as a starting material for the present invention. For the acidification, any of the ordinary mineral acids are satisfactory, such as hydrochloric acid, sulfuric acid, and the like.

The cystine-tyrosine cake (or a similar mixture containing tyrosine with around 10% or more of cystine) is admixed with between about 5 and about 10 parts by weight of water or aqueous alkali-metal hydroxide solution per part of cystine, and the pH is adjusted to the range of about 9.5 to 10.3, preferably 10.1, by adding alkali or acid as required. Additional water may be added as required to produce a fluid mixture. The resulting slurry is agitated for a short while, suitably 10 minutes to 2 hours or more, at a temperature between about 10 and about 50° C., preferably about 25° C. Under these conditions, the cystine is dissolved substantially completely, while the tyrosine remains undissolved. The resulting slurry is filtered, and the tyrosine cake is withdrawn for tyrosine recovery, suitably as in my U.S. Patent 2,738,366. The filtrate may be decolorized if desired by stirring with a small proportion of activated carbon, then filtering. The filtrate is adjusted to about pH 3.3 to about 3.9, preferably around 3.6, employing hydrochloric acid, sulfuric acid, or the like; and under these conditions, the cystine crystallizes substantially completely in around 6 to 24 hours.

The crystallized cystine is repulped with around 5 to 10 parts of hot water (60 to 100° C., preferably about 75–85° C.), and is filtered hot. This treatment removes any remaining traces of tyrosine. The filtrate may be recycled to tyrosine recovery. The repulped cystine is washed with a small amount of hot water, and is then dried at 100 to 120° C. The product is a white crystalline material containing 98–100% cystine.

The cystine obtained in this way may be further purified if desired by recrystallization. For this purpose, the cystine is dissolved in aqueous hydrochloric acid at pH 0.8, the solution is treated with activated carbon and filtered, the filtrate is heated to around 75° C. and adjusted to pH 3.6 with sodium hydroxide, and the cystine is allowed to crystallize therefrom. The recrystallized material is filtered off, washed with water, and dried.

My invention will be more fully understood from the following operating example.

Example

A crude cystine-tyrosine mixture (100 g.) containing 41.7% cystine, 45.25% tyrosine, 1.94% nitrogen (as $NH_4Cl$), 2.85% ash, and 1.51% moisture was suspended in 1650 ml. of water. To this suspension was added aqueous 50% sodium hydroxide solution with continued stirring until the pH remained constant at 10.1 for a total of 1.5 hours, 22.5 ml. of the caustic solution being required. The slurry was then filtered, and the undissolved solids were found to comprise almost entirely tyrosine with only 0.66% cystine content. The filtrate, which retained a small amount of colloidal material, was stirred with 10 g. of activated carbon for 15 minutes at room temperature, then filtered. The clear, light-yellow filtrate was adjusted to pH 3.6 with 35 ml. of 37% hydrochloric acid (sp. gr. 1.18), allowed to crystallize overnight at room temperature, and filtered. The filter cake was resuspended in 1500 ml. of water, heated to 85° C., filtered hot, washed with 200 ml. of hot water, and dried at 110° C. The product (42.6 g.) was 98.05% cystine, and contained only 0.016% tyrosine.

The foregoing operating example is intended only to illustrate my invention and not as a limitation upon the scope thereof. Numerous modifications and equivalents of the invention will be apparent to those skilled in the art.

In accordance with the foregoing description I claim as my invention:

1. A process for the purification of cystine containing tyrosine as a contaminant which comprises mixing said tyrosine-containing cystine with an aqueous solution of an alkali-metal hydroxide in a sufficient proportion to produce a pH between about 9.5 and 10.3 in the resulting mixture, whereby the cystine is selectively dissolved, separating the solid tyrosine from the resulting slurry, and recovering purified cystine from the aqueous phase.

2. The process of claim 1 wherein said mixture is adjusted to a pH of about 10.1.

3. A process for the isolation of substantially pure cystine from a mixture thereof with tyrosine which comprises commingling said mixture with a sufficient quantity of an aqueous solution of an alkali-metal hydroxide to produce a pH between about 9.5 and 10.3 in the resulting slurry, whereby cystine is selectively dissolved while tyrosine remains undissolved, separating the solid tyrosine from said slurry, acidifying the aqueous phase to between about pH 3.3 and 3.9, and crystallizing purified cystine therefrom.

4. A process for the isolation of substantially pure cystine from a mixture thereof with tyrosine containing at least about 10% by weight of cystine which comprises commingling said mixture with a sufficient quantity of aqueous sodium hydroxide solution to produce a pH of about 10.1 in the resulting slurry, whereby cystine is selectively dissolved while tyrosine remains undissolved, separating the solid tyrosine from said slurry, acidifying the aqueous phase to a pH of about 3.6, and crystallizing purified cystine therefrom.

5. A process for the isolation of substantially pure cystine from a mixture thereof with tyrosine which comprises commingling said mixture with a sufficient quantity of an aqueous solution of an alkali-metal hydroxide to produce a pH between about 9.5 and 10.3 in the resulting slurry, whereby cystine is selectively dissolved while tyrosine remains undissolved, separating the solid tyrosine from said slurry, acidifying the aqueous phase to between about pH 3.3 and 3.9, and crystallizing purified cystine therefrom, separating the crystallized cystine from the aqueous phase, and washing tyrosine from the crystalline cystine with water at a temperature between about 60 and about 100° C., whereby purified cystine is obtained, substantially free from tyrosine.

6. A process for the isolation of substantially pure cystine from a mixture thereof with tyrosine containing between about 10 and about 75% by weight of cystine which comprises commingling said mixture with a sufficient quantity of aqueous sodium hydroxide solution to produce a pH around 10.1 in the resulting slurry, whereby cystine is selectively dissolved while tyrosine remains undissolved, separating the solid tyrosine from said slurry, acidifying the aqueous phase to about pH 3.6, and crystallizing purified cystine therefrom, separating the crystallized cystine from the aqueous phase, and washing tyrosine from the crystalline cystine with water at a temperature between about 90 and about 100° C., whereby purified cystine is obtained, substantially free from tyrosine.

References Cited in the file of this patent
UNITED STATES PATENTS

| | | |
|---|---|---|
| 2,650,242 | Cardinal | Aug. 25, 1953 |
| 2,738,366 | Vassel | Mar. 13, 1956 |